United States Patent
Font Freide et al.

(10) Patent No.: US 7,566,678 B2
(45) Date of Patent: Jul. 28, 2009

(54) MODIFIED CATALYST AND USE OF THIS CATALYST FOR THE CONVERSION OF SYNTHESIS GAS TO HYDROCARBONS

(75) Inventors: Josephus Johannes Helena Maria Font Freide, Guildford (GB); Lawrence Trevor Hardy, Stockton-on-Tees (GB)

(73) Assignees: BP Exploration Operating Company Limited, Middlesex (GB); Davy Process Technology Limited, London (GB)

( * ) Notice: Subject to any disclaimer, the term of this patent is extended or adjusted under 35 U.S.C. 154(b) by 0 days.

(21) Appl. No.: 11/883,160

(22) PCT Filed: Feb. 9, 2006

(86) PCT No.: PCT/GB2006/000453

§ 371 (c)(1),
(2), (4) Date: Jul. 27, 2007

(87) PCT Pub. No.: WO2006/087522

PCT Pub. Date: Aug. 24, 2006

(65) Prior Publication Data

US 2008/0146684 A1    Jun. 19, 2008

(30) Foreign Application Priority Data

Feb. 17, 2005    (EP) .................. 05250923

(51) Int. Cl.
*B01J 31/00*    (2006.01)
*C07C 27/06*    (2006.01)

(52) U.S. Cl. .................. 502/158; 518/714; 518/715; 518/728

(58) Field of Classification Search ................ 502/158; 518/714, 715, 728
See application file for complete search history.

(56) References Cited

U.S. PATENT DOCUMENTS 3,415,864 A    12/1968    Gehrke et al.
6,297,180 B1    10/2001    Maier

FOREIGN PATENT DOCUMENTS

| DE | 197 43 165 A1 | 4/1999 |
| EP | 0 140 365 B1 | 5/1985 |
| EP | 0 180 269 A2 | 5/1986 |
| WO | WO 02/097012 A2 | 12/2002 |

OTHER PUBLICATIONS

Bu et al; "Improvement in hydrophobicity of Ti-MCM-41 using a new silylation agent MSTFA"; *Cataysis Letters*; 65, pp. 141-145 (2000).
Bu et al; "Synthesis and Modification of Ti-containing Catalysis for Epoxidation of Alkene"; *Studies in Surface Science & Catalysis*; 129, pp. 179-186 (2000).
Qi et al; "Effect of surface chemical properties and texture of mesoporous titanosilicates on direct vapor-phase epoxidation of propylene over Au catalysts at high reaction temperature"; *Applied Catalysis A: General*; 253, pp. 75-89 (2003).
Godfrey et al; "Plasmachemical Functionalization of Porous Polystyrene Beads"; *Chemistry of Materials*; 13, pp. 513-518 (2001).
Kim, D.J., et al; "Enhancement in the reducibility of cobalt oxides on a mesoporous silica supported cobalt catalyst"; *Chem Communication*; No. 11; pp. 1462-1464 (2005) XP-002401180.

*Primary Examiner*—Porfirio Nazario Gonzalez
(74) *Attorney, Agent, or Firm*—Nixon & Vanderhye

(57) ABSTRACT

The present invention relates to a process for the conversion of synthesis gas to hydrocarbons in the presence of a modified supported Fischer-Tropsch catalyst composition.

14 Claims, No Drawings

MODIFIED CATALYST AND USE OF THIS CATALYST FOR THE CONVERSION OF SYNTHESIS GAS TO HYDROCARBONS

This application is the U.S. National Phase of International Application PCT/GB2006/000453, filed 9 Feb. 2006, which designated the U.S. PCT/GB2006/000453 claims priority to European Application No. 05250923.9 filed 17 Feb. 2005. The entire content of these applications are incorporated herein by reference.

The present invention relates to the conversion of synthesis gas to hydrocarbons. In particular, it relates to the conversion of synthesis gas to C5+ hydrocarbons particularly suitable for use as liquid motor fuels.

It is well known that synthesis gas, i.e., hydrogen and carbon monoxide, can be converted to hydrocarbons in the presence of a variety of transition metal catalysts. Thus, certain-Group VIII metals, particularly iron, cobalt, ruthenium and nickel, are known to catalyse the conversion of CO and hydrogen, also referred to as syngas, to hydrocarbons. Such metals are commonly called Fischer-Tropsch catalysts. While the use of nickel preferentially produces methane upon conversion of syngas; the use of iron, cobalt and ruthenium tends to produce hydrocarbon mixtures consisting of hydrocarbons having a larger carbon number than methane. At higher reaction temperatures, all Fischer-Tropsch catalysts tend to produce gaseous hydrocarbons, and it is readily feasible to select processing conditions to produce methane as the principal product. At lower temperatures, and usually at higher pressures, however, iron, cobalt and ruthenium produce hydrocarbon mixtures consisting of larger hydrocarbons. The products usually contain very long straight-chain hydrocarbon molecules that tend to precipitate as wax. Such wax material, boiling well beyond the boiling range of motor fuels, typically constitutes a significant fraction of the product produced in such catalytic conversion operations. Fischer-Tropsch catalysts, therefore, have not been advantageously employed in the production of liquid hydrocarbon motor fuels, since they have commonly produced either principally gaseous hydrocarbons, on the one hand, or hydrocarbons containing an unacceptably large amount of wax on the other. In addition, the gasoline boiling hydrocarbon fraction produced has an unacceptably low octane number.

Another difficulty present in the production of liquid motor fuels, particularly those boiling in the gasoline boiling range, by the conversion of syngas in the presence of Fischer-Tropsch metal catalysts is the tendency of such Fischer-Tropsch metals to characteristically produce straight chain hydrocarbons consisting of a mixture of n-paraffins and n-olefins. The actual mixture obtained will be understood to depend upon the particular metal catalyst and the process conditions employed. In any event, the conversion product will generally contain only small amounts of mono-branched and almost no multi-branched hydrocarbons, as well as very little naphthenes and aromatics. The absence of branched or aromatic, i.e. cyclic, hydrocarbons in the conversion products results in such products having gasoline fractions of very low octane number, or O.N. Such fractions are not suitable for use as gasoline without the addition of further, expensive refining steps. The larger n-paraffins produced in the C10-C18 range by such metal catalysts are, of course, desirable components for incorporation in jet and diesel fuels. However, the presence of some branched and aromatic hydrocarbons are also desired in such components to enhance the thermal efficiency of the overall process for converting raw syngas to such liquid motor fuels and to reduce the pour point of such fuels.

For the reasons above, the development of improved technology for the conversion of syngas to liquid hydrocarbon fuels is desired in the art. Such improved technology would desirably enable such syngas conversion to be carried out with (1) enhanced branching and aromatisation as compared with the present production of predominately n-paraffins and n-olefins, and (2) enhanced production of desired liquid motor fuels by reducing the formation of methine and of heavy hydrocarbon products boiling beyond the boiling range of diesel oil. At the same time, the catalyst composition must have a requisite degree of activity and stability to enable the production of such motor fuels to be carried out in practical commercial operations.

It is an object of the invention, therefore, to provide an improved process and catalyst composition for the conversion of syngas to liquid hydrocarbon motor fuels.

It is another object of the invention to provide a stable catalyst composition capable of enhancing the conversion of syngas to such liquid fuels.

It is a further object of the invention to provide a process and Fischer-Tropsch catalyst composition for producing liquid motor fuels containing minimal amounts of methane and of heavy hydrocarbon products boiling beyond the boiling range of diesel oil.

With these and other objects in mind, the invention is hereinafter described in detail; the novel features thereof being particularly pointed out in the appended claims.

Synthesis gas is converted to liquid motor fuels in the practice of the invention by the use of a modified catalyst composition containing a supported Fischer-Tropsch metal as a component thereof. The conversion product contains minimal amounts of methane and of heavy products boiling beyond the boiling range of diesel oil.

The objects of the invention are accomplished by modifying a catalyst composition containing a supported Fischer-Tropsch metal and using it in the conversion of syngas to liquid hydrocarbons. Contrary to the results previously obtained by the use of unmodified Fischer-Tropsch catalysts for syngas conversion, the use of such a modified catalyst composition results in an advantageous production of liquid motor fuels boiling in the jet fuel plus diesel oil boiling range. As the modified catalyst composition is found to have outstanding stability over the course of continuous processing operations, the modified catalyst composition and the process for its use for syngas conversion, as herein described and claimed, represent a highly desirable and practical approach to the desired production of liquid motor fuels boiling in the gasoline, jet fuel and diesel oil boiling range.

The synthesis gas, or syngas, treated in accordance with the practice of the invention generally comprises a mixture of hydrogen and carbon monoxide, although smaller amounts of carbon dioxide, methane, nitrogen and other components may also be present as will be well known to those skilled in the art. The syngas may be prepared using any of the processes known in the art including partial oxidation of hydrocarbons, steam reforming, gas heated reforming, microchannel reforming (as described in, for example, U.S. Pat. No. 6,284,217 which is herein incorporated by reference), plasma reforming, autothermal reforming and any combination thereof. A discussion of these synthesis gas production technologies is provided in "Hydrocarbon Processing" V78, N.4, 87-90, 92-93 (April 1999) and "Petrole et Techniques", N. 415, 86-93 (July-August 1998). It is also envisaged that the synthesis gas may be obtained by catalytic partial oxidation of hydrocarbons in a microstructured reactor as exemplified in "IMRET 3: Proceeding of the Third International Conference on Microreaction Technology", Editor W Ehrfeld, Springer Verlag, 1999, pages 187-196. Alternatively, the synthesis gas may be obtained by short contact time catalytic partial oxidation of hydrocarbonaceous feedstocks as described in EP 0303438. Preferably, the synthesis gas is obtained via a "Compact Reformer" process as described in "Hydrocarbon Engineering", 2000, 5, (5), 67-69; "Hydrocarbon Processing", 79/9, 34 (September 2000); "Today's Refinery", 15/8, 9 (August 2000); WO 99/02254; and WO 200023689.

The Fischer-Tropsch process of the invention is preferably carried out at a temperature of 180-280° C., more preferably 190-240° C. The Fischer-Tropsch process of the invention is preferably carried out at a pressure of 5-50 bar, more preferably 15-35 bar, generally 20-30 bar.

Preferably, the ratio of hydrogen to carbon monoxide in the synthesis gas is in the range of 20:1 to 0.1:1 by volume and especially in the range of 5:1 to 1:1 by volume e.g. 2:1 by volume.

The modified catalyst composition of the invention, employed as described herein for the conversion of syngas to liquid motor fuels, contains a Fischer-Tropsch metal supported on an appropriate carrier. Various Group VIII metals known to catalyse the conversion of syngas to hydrocarbons, and commonly referred to as Fischer-Tropsch catalysts, may be employed in the practice of the invention, e.g. iron, cobalt, ruthenium and nickel as well as molybdenum, tungsten, rhenium and the like. It has been found that, on an overall evaluation basis, the use of iron and of cobalt as the Fischer-Tropsch metal component of the catalytic composition is particularly desirable for purposes of the invention.

The second principal component of the catalyst composition of the invention is the support which can preferably be chosen amongst alumina, silica, titania, zinc oxide or mixtures thereof. It has been found that, on an overall evaluation basis, the use of zinc oxide as the support of the Fischer-Tropsch metal component of the catalytic composition is particularly desirable for purposes of the invention.

According to a preferred embodiment of the present invention, the catalyst employed in the process of the present invention is a cobalt supported catalyst. Preferably the cobalt is supported on an inorganic oxide. Preferred supports include silica, alumina, silica-alumina, the Group IVB oxides, titania (primarily in the rutile form) and preferably zinc oxide. The supports generally have a surface area of less than about 100 m$^2$/g, suitably less than 50 m$^2$/g, for example, less than 25 m$^2$/g or about 5 m$^2$/g.

Usually at least 0.1% cobalt (by weight of support) is present and preferably about 0.1-20%, and especially 0.5-5 wt %. Promoters may be added to the catalyst and are well known in the Fischer-Trospch catalyst art. Promoters can include ruthenium, platinum or palladium (when not the primary catalyst metal), aluminium, rhenium, hafnium, cerium, lanthanum and zirconium, and are usually present in amounts less than the cobalt (except for ruthenium which may be present in coequal amounts), but the promoter:metal ratio should be at least 1:10. Preferred promoters are rhenium and hafnium. The particulate Fischer-Tropsch catalyst may have an average particle size in the range 5 to 500 microns, preferably 5 to 100 microns, for example, in the range 5 to 40 microns.

The modification of the catalyst composition of the present invention is obtained by using a silylating compound. This silylating compound may be used during the catalyst preparation or during a post-treatment stage. According to a preferred embodiment of the present invention, the prepared catalyst composition containing the supported Fischer Tropsch metal is post-treated with the silylating compound.

The silylating compound used according to the present invention is preferably chosen amongst organosilicon compound, more preferably chosen amongst trimethyl silicon compounds, most preferably chosen amongst trimethylsilyl chloride, bis (trimethylsilyl)trifluoroacetamide, N-methyl-N-(trimethylsilyl)trifluoroacetamide, and mixtures thereof. According to a preferred embodiment of the present invention, bis (trimethylsilyl)trifluoroacetamide is used as modifier.

The Applicants have unexpectedly found that the modified catalysts of the present invention show an increased activity and a longer catalyst life.

While not wishing to be bound to this theory, the Applicants believe that the use of the organosilicon compound has transformed the catalyst in such a way that a water repelling/dispersing functionality has been created. Indeed, it is well known that some water is produced in the course of the syngas conversion into hydrocarbons and that this water is detrimental to the activity and lifetime of the Fischer Tropsch catalyst. The exceptional behaviour of the modified catalyst of the present invention might thus be the result of the introduction of a chemical functionality that has a hydrophobic component in the catalyst composition, and that this hydrophobic component is able to disperse and repel produced water from the catalyst so leading to an increase in activity and longer catalyst life.

The invention is hereinafter described with reference to certain specific examples that are presented to illustrate various embodiments, but that should not be construed as limiting the scope of the invention as set forth in the appended claims.

EXAMPLE 1

Preparation of Hydrophobic Catalyst 20 g of B958-30, an Engelhard cobalt based Fischer Tropsch catalyst dried at 100° C. or 1 hour then cooled, was weighed into a sealable glass vessel and a derivatization grade silating reagent [Bis (trimethylsilyl)trifluoroacetamide] was added to completely immerse the catalyst. The vessel was sealed and stored in a refrigerator at approximately 4° C. overnight. After 16 hours soaking the supernatant liquid was drained from the solid and the tread catalyst allowed to air-dry.

EXAMPLE 2

Testing of Hydrophobic Catalyst 10.0 ml (14.5 g) of the treated catalyst was charged to a fixed bed reactor and activated as follows:—

Nitrogen flow at a GHSV=1800 hr−1 was established to the reactor which was at ambient temperature and pressure and then the reactor temperature was increased at 1° C. per min to 250° C. The pressure in the system was that required to overcome the pressure drop across the catalyst bed, the exit gas from the reactor was at atmospheric pressure. When the reactor was at 250° C., the catalyst was allowed to dwell at this temperature for 1 hr before the nitrogen flow was changed to carbon monoxide flowing at the same GHSV. Reduction of the catalyst with carbon monoxide was continued for 3.5 hrs before the carbon monoxide flow was stopped and replaced with the same flow of nitrogen to purge all the reductant gas out of the system. When the system was free of carbon monoxide, the flow was stopped and replaced by hydrogen flowing at a GHSV=800 hr−1. Hydrogen reduction at 250° C. was continued for 16 hrs before the heat to the reactor was turned off and the catalyst allowed to cool under the continuing hydrogen flow.

Testing of the activated catalyst was as follows: —

At the end of activation, the catalyst was allowed to cool below 130° C. when the hydrogen flow was replaced by a synthesis gas (a mixture of hydrogen, carbon monoxide and nitrogen) supplied from a cylinder produced by differential component pressures flowing at a GHSV=1800 hr-1 and the system slowly pressurised to 430 psig.

The temperature of the reactor was then slowly increased and the performance of the catalyst producing Fischer Tropsch products was monitored.

| Hours on stream (hr) | GHSV (hr$^{-1}$) | Temperature (° C.) | Conversion (mole %) | Selectivity to >C5 |
|---|---|---|---|---|
| 18.5 | 1800 | 203 | 37.4 | 82.2 |
| 91.0 | 1800 | 208 | 36.6 | 76.8 |
| 121 | 1800 | 208 | 35.0 | 76.5 |

EXAMPLE 3

Testing of Standard Catalyst 10 ml (14.3 g) of "as received" Engelhard catalyst B958-30 was charged to a fixed bed reactor and activated using the method previously described in Example 2.

Testing of the activated catalyst was again performed using the methods described in Example 2.

| Hours on stream (hr) | GHSV (hr$^{-1}$) | Temperature (° C.) | Conversion (mole %) | Selectivity to >C5 |
|---|---|---|---|---|
| 8.0 | 1250 | 186 | 15.7 | 79.6 |
| 89.5 | 1250 | 206 | 27.9 | 74.9 |
| 125.5 | 1250 | 207 | 25.2 | 73.8 |

The invention claimed is:

1. Modified catalyst composition containing a support and a Fischer-Tropsch metal for the conversion of syngas to liquid hydrocarbons, wherein a silylating compound modifier is added to said catalyst composition during the catalyst preparation or during a post-treatment stage.

2. Catalyst composition according to claim 1 wherein the silylating compound is added during a post-treatment stage.

3. Catalyst composition according to claim 1 wherein the silylating compound is chosen amongst organosilicon compounds.

4. Catalyst composition according to claim 3 wherein the silylating compound is chosen amongst trimethyl silicon compounds.

5. Catalyst composition according to claim 4 wherein the silylating compound is bis (trimethylsilyl)trifluoroacetamide.

6. Catalyst composition according to claim 1 wherein the Fischer-Tropsch metal is a Group VIII metal.

7. Catalyst composition according to claim 6 wherein the Fischer-Tropsch metal is selected from the group consisting of iron and cobalt.

8. Catalyst composition according to claim 1 wherein the support is selected from the group consisting of alumina, silica, titania, zinc oxide and mixtures thereof.

9. Catalyst composition according to claim 1 containing from 0.1 to 20 wt % cobalt (wrt support) supported on an inorganic oxide having a surface area of less than 100 m$^2$/g, and a promoter selected from the group consisting of ruthenium, platinum (when not the primary catalyst metal), palladium (when not the primary catalyst metal), aluminum, rhenium, hafnium, cerium, lanthanum and zirconium, said promoter being present in amounts less than the cobalt and with a promoter:metal ratio by weight of at least 1:10.

10. Process for the conversion of syngas to liquid hydrocarbons in the presence of a modified supported Fischer-Tropsch catalyst composition according to claim 1.

11. Catalyst composition according to claim 4 wherein the silylating compound is selected from the group consisting of trimethylsilyl chloride, bis (trimethylsilyl)trifluoroacetamide, N-methyl-N-(trimethylsilyl)trifluoroacetamide, and mixtures thereof.

12. Catalyst composition according to claim 6 wherein the Group VIII metal is selected from the group consisting of iron, cobalt, ruthenium and nickel.

13. Catalyst composition according to claim 8 wherein the support is zinc oxide.

14. Catalyst composition according to claim 1 wherein the Fischer-Tropsch metal is selected from the group consisting of molybdenum, tungsten and rhenium.

* * * * *